US009588356B2

(12) United States Patent
Keates (10) Patent No.: US 9,588,356 B2
(45) Date of Patent: Mar. 7, 2017

(54) BATTERY STRUCTURE FOR EYEWEAR APPARATUS

(71) Applicant: Intel Corporation, Santa Clara, CA (US)

(72) Inventor: Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/579,939

(22) Filed: Dec. 22, 2014

(65) Prior Publication Data

US 2016/0178935 A1    Jun. 23, 2016

(51) Int. Cl.
*G02C 7/04*    (2006.01)
*G02C 11/00*    (2006.01)

(52) U.S. Cl.
CPC .................... *G02C 11/10* (2013.01)

(58) Field of Classification Search
CPC .......... G02C 7/083; G02C 7/04; G02C 11/10; G02C 2202/16; G02C 7/02
USPC ..... 351/158, 49, 41, 159.01, 159.02, 159.03
See application file for complete search history.

(56) References Cited

U.S. PATENT DOCUMENTS

| | | | |
|---|---|---|---|
| 5,585,871 A | 12/1996 | Linden | 351/158 |
| 5,980,037 A | 11/1999 | Conway | |
| 7,648,236 B1 | 1/2010 | Dobson | 351/158 |
| 8,466,004 B2 | 6/2013 | Peumans et al. | |
| 8,577,425 B2 | 11/2013 | Kroll et al. | |
| 8,593,795 B1 | 11/2013 | Chi | 361/679.03 |
| 8,705,177 B1 | 4/2014 | Miao | 359/630 |
| 8,775,844 B1 | 7/2014 | Peterson | 713/323 |
| 8,848,289 B2 | 9/2014 | Amirparviz et al. | 359/485.05 |
| 2012/0236524 A1* | 9/2012 | Pugh | G02C 7/04 361/783 |
| 2013/0072828 A1 | 3/2013 | Sweis et al. | 601/37 |
| 2014/0185003 A1 | 7/2014 | Waters | 351/158 |
| 2014/0267648 A1 | 9/2014 | Wexler | 348/62 |
| 2014/0336723 A1 | 11/2014 | Ben-Ezra et al. | 607/45 |

FOREIGN PATENT DOCUMENTS

KR    10-2010-0067881    6/2010
KR    20-2012-002069    3/2012

OTHER PUBLICATIONS

International Search Report for PCT/US2015/061351 dated Mar. 8, 2016.
Written Opinion for PCT/US2015/061351 dated Mar. 8, 2016.

* cited by examiner

Primary Examiner — Hung Dang
(74) Attorney, Agent, or Firm — KED & Associates LLP (57) ABSTRACT

An eyewear apparatus is provided that includes a lens structure having a lens panel, and a battery structure on the lens panel. The battery structure may include an anode, a separator and a cathode, and may also include a solar panel.

20 Claims, 7 Drawing Sheets

BATTERY STRUCTURE FOR EYEWEAR APPARATUS

BACKGROUND

1. Field

Embodiments may relate to a battery structure for an eyewear apparatus.

2. Background

An eyewear apparatus may include at least one electronic component that needs power in order to operate. Power may be provided from a battery or an external power source.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be provided although embodiments are not limited to the same. Where specific details are set forth in order to describe example embodiments, it should be apparent to one skilled in the art that embodiments may be practiced without these specific details.

Figure 1:
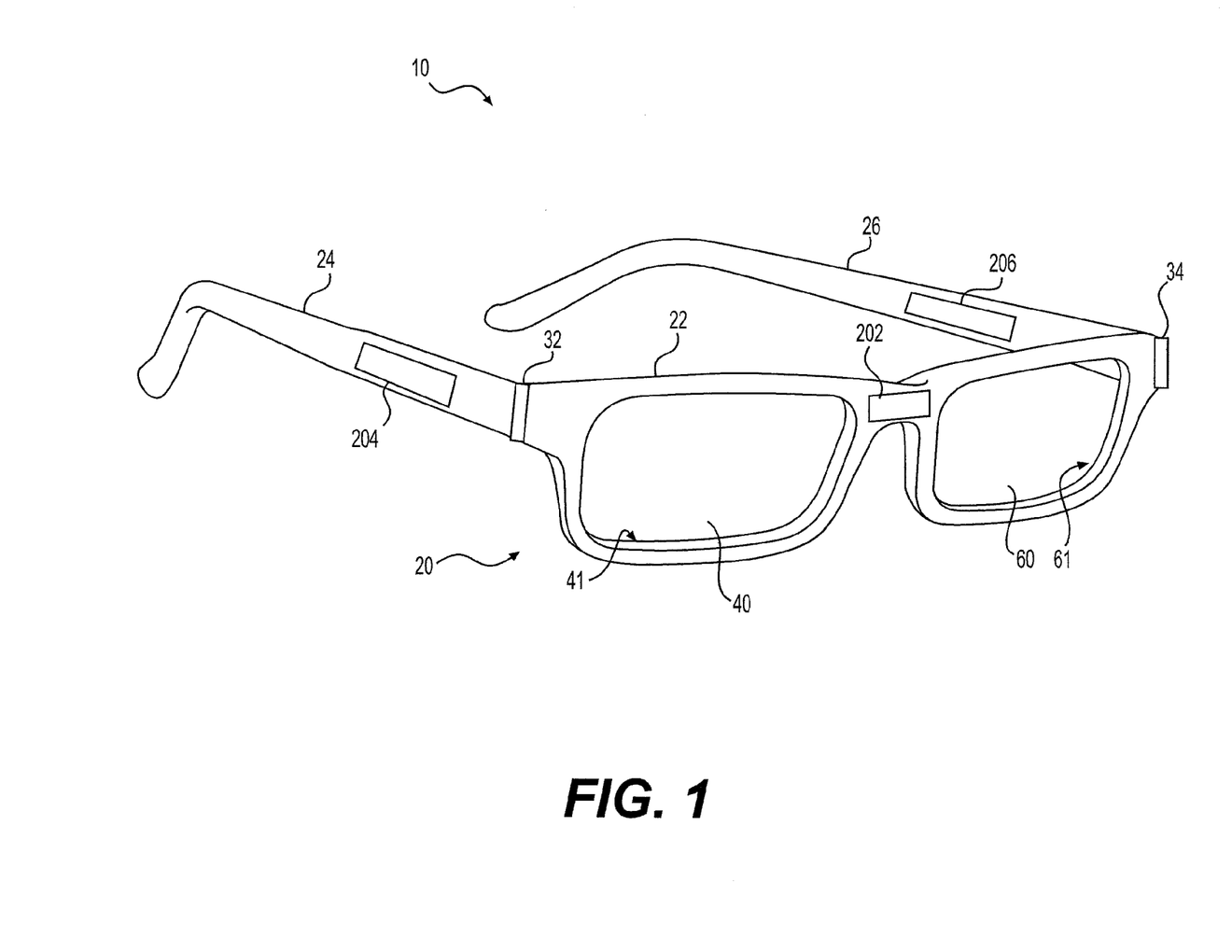
FIG. 1 shows an eyewear apparatus according to an example embodiment.

FIG. 1 shows an eyewear apparatus according to an example embodiment. Other embodiments and configurations may also be provided.

FIG. 1 shows an eyewear apparatus 10 that includes a frame assembly 20, a first lens structure 40 and a second lens structure 60. The eyewear apparatus 10 may be provided on a user's head. The eyewear apparatus 10 may also be called a head mounted display (HMD).

The frame assembly 20 may include a main frame 22, a first arm 24 and a second arm 26. The first arm 24 may be coupled to the main frame 22 by a first hinge device 32. The second arm 26 may be coupled to the main frame 22 by a second hinge device 34.

The main frame 22 may include a first lens opening 41 (or first lens holding member) and a second lens opening 61 (or second lens holding member). The first lens structure 40 may be provided at the first lens opening 41 (or at the first lens holding member), and the second lens structure 60 may be provided at the second lens opening 61 (or at the second lens holding member).

The first lens structure 40 may include a first lens panel, and the second lens structure 60 may include a second lens panel. The first and second lens panels may be any one (or more) of the following: prescription lens, non-prescription lens, tinted lens, safety lens and/or the like. The first and second lens panels may be transparent such that light may pass through the respective lens panel. The lens panel may be made of glass or plastic, for example.

The first lens panel may be provided at the first lens holding member, which may be part of the frame 22 to support the first lens structure 40. The first lens holding member may support at least part of a perimeter of the first lens panel. In at least one embodiment, the first lens holding member may support an entire perimeter of the first lens panel.

The second lens panel may be provided at the second lens holding member which may be part of the frame 22 to support the second lens structure 60. The first lens holding member may support at least part of a perimeter of the second lens panel. In at least one embodiment, the second lens holding member may support an entire perimeter of the second lens panel.

FIG. 1 also shows a first area 202 at the main frame 22, a second area 204 at the first arm 24 and a third area 206 at the second arm 26. A charge circuit may be provided at one of the first area 202, the second area 204 and the third area 206.

Additionally, an electronic component may be provided at the frame assembly 20. For example, an electronic component may be provided at any one of the first area 202, the second area 204 and the third area 206. The electronic component may receive power from a battery structure.

Figure 2:
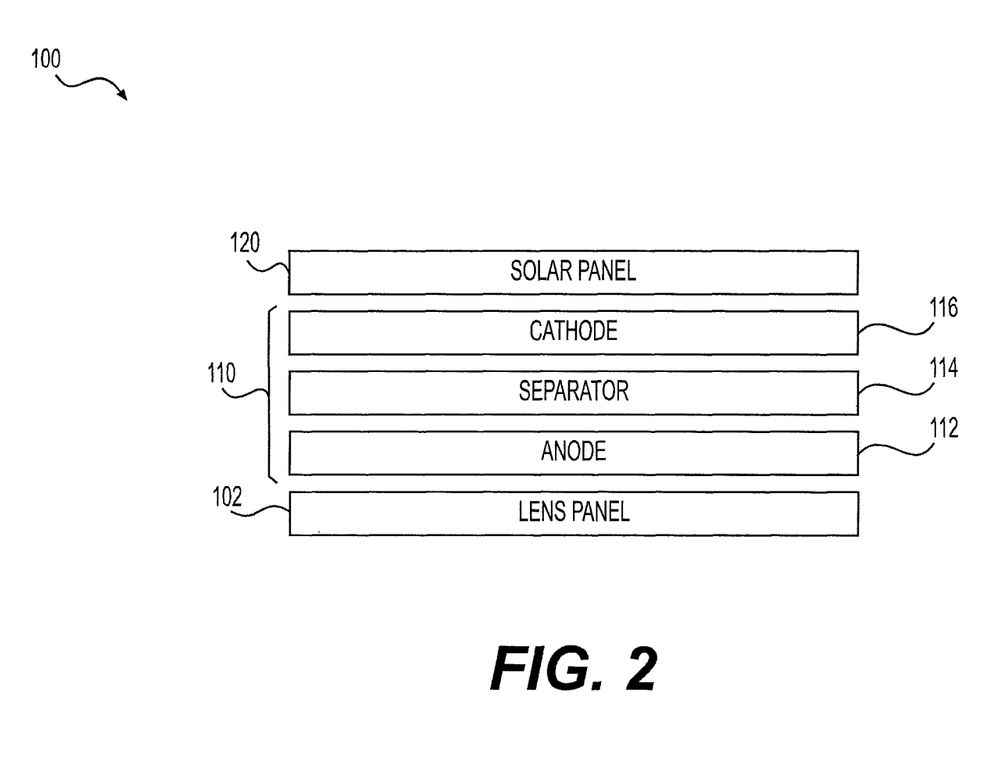
FIG. 2 shows a lens structure according to an example embodiment.

FIG. 2 shows a lens structure according to an example embodiment. Other embodiments and configurations may also be provided. A lens structure 100 shown in FIG. 2 may be provided as the first lens structure 40, the second lens structure 60 and/or both the first lens structure 40 and the second lens structure 60. FIG. 2 shows the arrangement of different elements/features that form the lens structure.

The lens structure 100 may include a lens panel 102, a battery structure 110 and a solar panel 120. The battery structure 110 may be provided on the lens panel 102. The solar panel 120 may be provided on the battery structure 110. The lens panel 102, the battery structure 110 and the solar panel 120 may collectively form the lens structure 100 to be provided at the first lens opening 41 (or at the first lens holding member) of the eyewear apparatus. The lens panel 102, the battery structure 110 and the solar panel 120 may collectively form the lens structure 100 to be provided at the second lens opening 61 (or at the second lens holding member) of the eyewear apparatus. The lens structure 100 may include more or less components than as shown in FIG. 2.

The battery structure 110 may include an anode 112, a separator 114 and a cathode 116. As shown in FIG. 2, the anode 112 may be provided on the lens panel 102, the separator 114 may be provided on the anode 112, the cathode 116 may be provided on the separator 114, and the solar panel 120 may be provided on the cathode 116. Other arrangements and/or orders of elements/features may also be provided. As another example, the cathode may be provided on the lens panel 102, the separator may be provided on the cathode, the anode may be provided on the separator, and the solar panel 120 may be provided on the anode.

The battery structure 110 may be used with the eyewear apparatus 10 to store energy (and provide power) for electronic components associated with the eyewear apparatus. The electronic components may receive power from the battery structure. During operation, current may flow into the anode 112 (of the battery structure 110) from a power source, such as a battery charger and/or an AC/DC (alternate current/direct current) converter. Current may flow out from the cathode 116 (of the battery structure 110) in order to provide power (or energy) to other electronic components, such as a load of the eyewear apparatus. The load of the eyewear apparatus may be any one (or more) of various electronic components such as a display, a speaker, a microphone, a haptic unit, a controller, a processor, a wireless communication unit, etc.

In order to store power in the battery structure 110, a structure of the anode 112 or the cathode 116 may be specifically designed to store more power or energy. For example, the anode 112 (or anode structure) may be made of carbon, graphite and/or silicon. The cathode 116 (or cathode structure) may be made of lithium metal oxide, such as LCO ($LiCoO_2$, Lithium Cobalt Oxide).

The separator 114 (or separator structure) may be made of an ionic conductor such as a ceramic or polymer.

The solar panel 120 may be provided on the battery structure 110. The solar panel 120 may receive energy (from sunlight or other light) and provide energy to the battery structure 110 (via a charge circuit, for example). The solar panel 120 may provide a current based on the received energy. The battery structure 110 may store energy or power obtained from the solar panel 120 provided on the lens structure.

Figure 3:
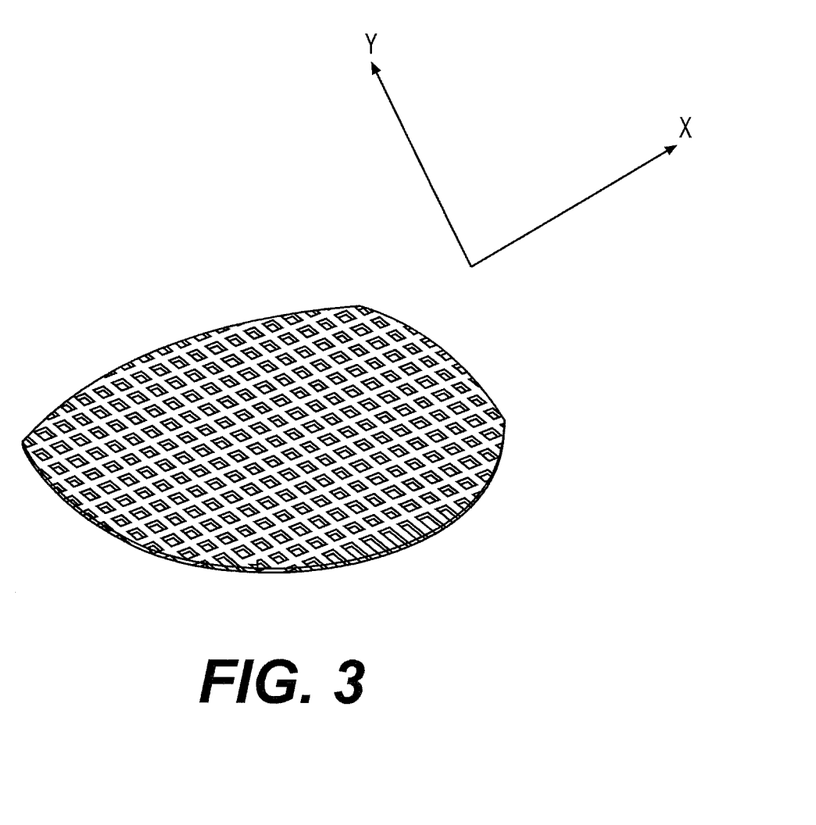
FIG. 3 shows a battery structure according to an example embodiment.

FIG. 3 shows a battery structure according to an example embodiment. Other embodiments and configurations may also be provided.

FIG. 3 shows that the battery structure 110 may be provided in a grid configuration. In the grid configuration, each of the anode 112, the separator 114 and the cathode 116 (of the battery structure 110) may be provided as part of the grid configuration.

The battery structure 110 includes a grid configuration of the anode 112, a grid configuration of the separator 114 and a grid configuration of the cathode 116. The grid configuration of the separator 114 may be aligned with the grid configuration of the anode 112, and the grid configuration of the cathode 116 may be aligned with the grid configuration of the separator 114.

The battery structure 110 (the anode 112, the separator 114 and the cathode 116), provided in the grid formation, may be provided on the lens panel 102. The lens panel 102 may have a flat structure or a curved structure. The lens panel 102 may be provided at the entire first lens opening 41 (or at the second lens opening 61), and the battery structure 110, provided in the grid configuration, may be provided on the lens panel 102.

The battery structure 110 having the grid configuration may be provided at the first lens opening 41 (or at the first lens holding member). The battery structure 110 having the grid configuration may be provided at the second lens opening 61 (or at the second lens holding member).

The grid configuration of the battery structure 110 may include stacked components (the anode 112, the separator 114 and the cathode 116) in a first direction (along an x-axis shown in FIG. 3) and stacked components (the anode 112, the separator 114 and the cathode 116) in a second direction (along a y-axis shown in FIG. 3). The grid configuration may include openings between different x-axis components and y-axis components. Light may traverse through the openings of the grid configuration. The light may be travel through any of the openings, through the lens panel and into an eye of a user.

The battery structure 110 may store energy or power while being provided on the lens panel 102, and allow light to transverse through the lens structure.

Figure 4:
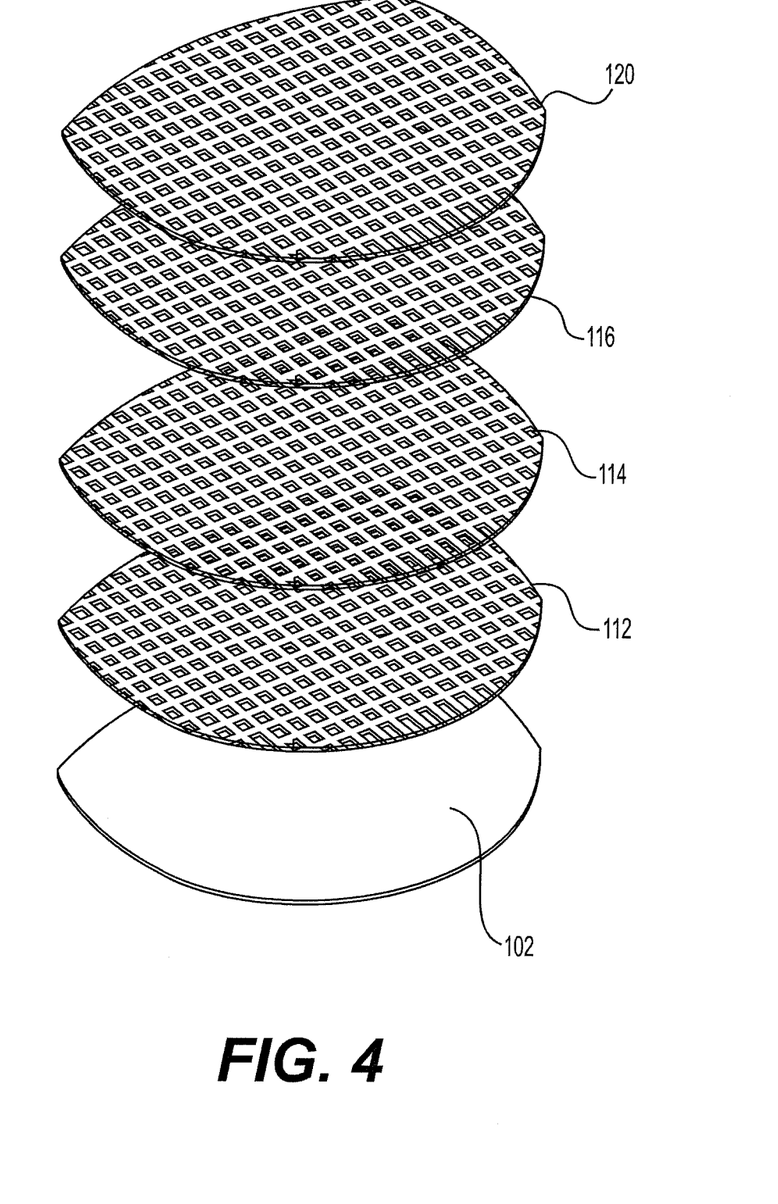
FIG. 4 shows a lens structure (in a separated manner) according to an example embodiment.

FIG. 4 shows a lens structure (in a separated manner) according to an example embodiment. Other embodiments and configurations may also be provided.

FIG. 4 shows the lens panel 102, the anode 112 (in a grid configuration), the separator 114 (in a grid configuration), the cathode 116 (in a grid configuration), and the solar panel 120 (in a grid configuration).

The grid configuration of the separator 114 may be aligned with the grid configuration of the anode 112. The grid configuration of the cathode 116 may be aligned with the grid configuration of the separator 114. Additionally, the grid configuration of the solar panel 120 may be aligned with the grid configuration of the cathode 116.

The alignment of the different grid configurations may allow openings to be aligned from each of the anode 112, the separator 114, the cathode 116 and the solar panel 102. The aligned openings may allow light to pass from a first side of the lens structure to a second side of the lens structure. This may allow a user to view an image via the openings of the lens structure.

Figure 5:
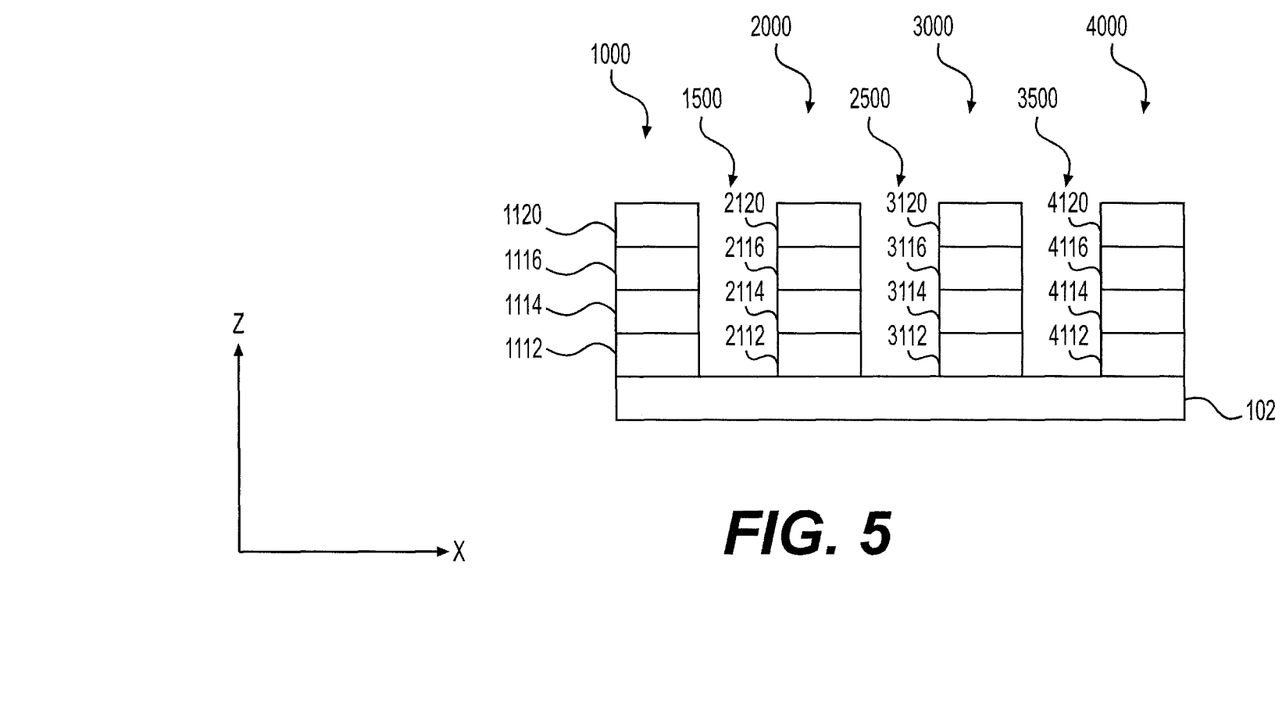
FIG. 5 is a side view of a lens structure according to an example embodiment.

FIG. 5 is a side view of the lens structure according to an example embodiment. Other embodiments and configurations may also be provided.

In the grid configuration, battery components may extend along an x-axis and a y-axis. FIG. 5 shows a cross-section of the lens structure showing battery components extending in the y-axis. More specifically, FIG. 5 shows a first stacked structure 1000, a second stacked structure 2000, a third stacked structure 3000 and a fourth stacked structure 4000.

The first stacked structure 1000 provided on the lens panel 102 may include an anode part 1112, a separator part 1114, a cathode part 1116 and a solar panel part 1120.

The second stacked structure 2000 provided on the lens panel 102 may include an anode part 2112, a separator part 2114, a cathode part 2116 and a solar panel part 2120.

The third stacked structure 3000 provided on the lens panel 102 may include an anode part 3112, a separator part 3114, a cathode part 3116 and a solar panel part 3120.

The fourth stacked structure 4000 provided on the lens panel 102 may include an anode part 4112, a separator part 4114, a cathode part 4116 and a solar panel part 4120.

Other formations of the stacked structures may also be provided.

An opening 1500 may be provided between the first stacked structure 1000 and the second stacked structure 2000. An opening 2500 may be provided between the second stacked structure 2000 and the third stacked structure 3000. Additionally, a third opening 3500 may be provided between the third stacked structure 3000 and the fourth stacked structure 4000. Other openings and stacked structures may also be provided.

Light may pass through the openings 1500, 2500, 3500 and through the lens panel 102. Thus, a user may be able to view an image by viewing through the lens panel 102 and the openings 1500, 2500, 3500 of the battery structure.

Figure 6:
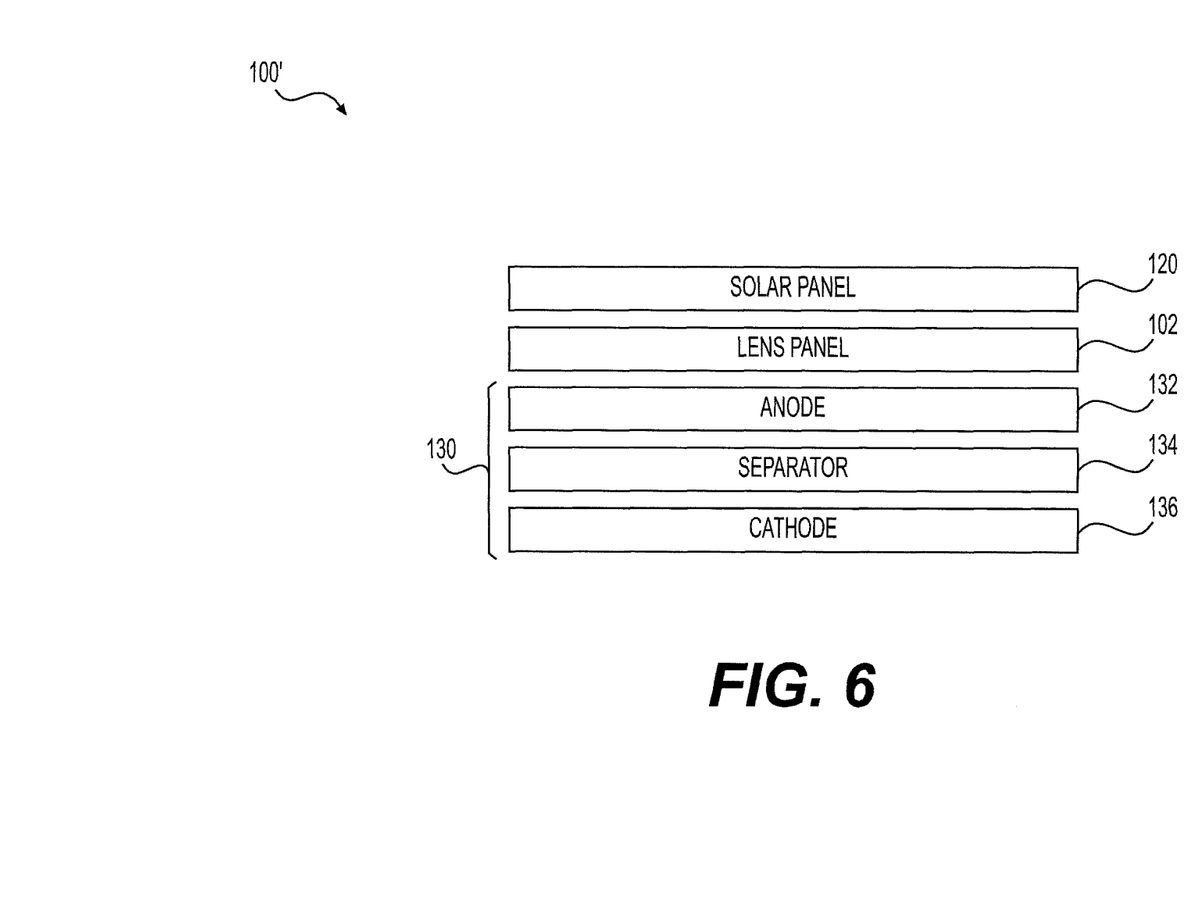
FIG. 6 shows a lens structure according to an example embodiment.

FIG. 6 shows a lens structure according to an example embodiment. Other embodiments and configurations may also be provided. A lens structure 100' shown in FIG. 6 may correspond to the first lens structure 40, the second lens structure 60 and/or both the first lens structure 40 and the second lens structure 60. FIG. 6 shows the arrangement of different elements/features that form the lens structure.

The lens structure 100' may include a battery structure 130, the lens panel 102 and the solar panel 120. In the FIG.

6 embodiment, the lens panel 102 may be provided on the battery structure 130 and the solar panel 120 may be provided on the lens panel 102. The battery structure 130, the lens panel 102 and the solar panel 120 may collectively form the lens structure 100' to be provided at the first lens opening 41 (or at the first lens holding member). The lens panel 102, the battery structure 130 and the solar panel 120 may collectively form the lens structure 100' to be provided at the second lens opening 61 (or at the second lens holding member).

The battery structure 130 may include an anode 132, a separator 134, and a cathode 136. As shown in FIG. 6, the anode 132 may be provided on the lens panel 102, the separator 134 may be provided on the anode 132, and the cathode 136 may be provided on the separator 134. The solar panel 120 may be provided on the lens panel 102. Other arrangements and/or orders of elements/features may also be provided. As another example, the cathode may be provided on the lens panel 102, the separator may be provided on the cathode, the anode may be provided on the separator, and the solar panel 120 may be provided on the lens panel 102.

The battery structure 130 may be used with the eyewear apparatus 10 to store energy (and provide power) for electronic components associated with the eyewear apparatus. The electronic components may receive power from the battery structure. During operation, current may flow into the anode 132 (of the battery structure 130) from a power source, such as a battery charger and/or an AC/DC (alternate current/direct current) converter. Current may flow out from the cathode 136 (of the battery structure 130) in order to provide power (or energy) to other electronic components, such as a load of the eyewear apparatus.

Figure 7:
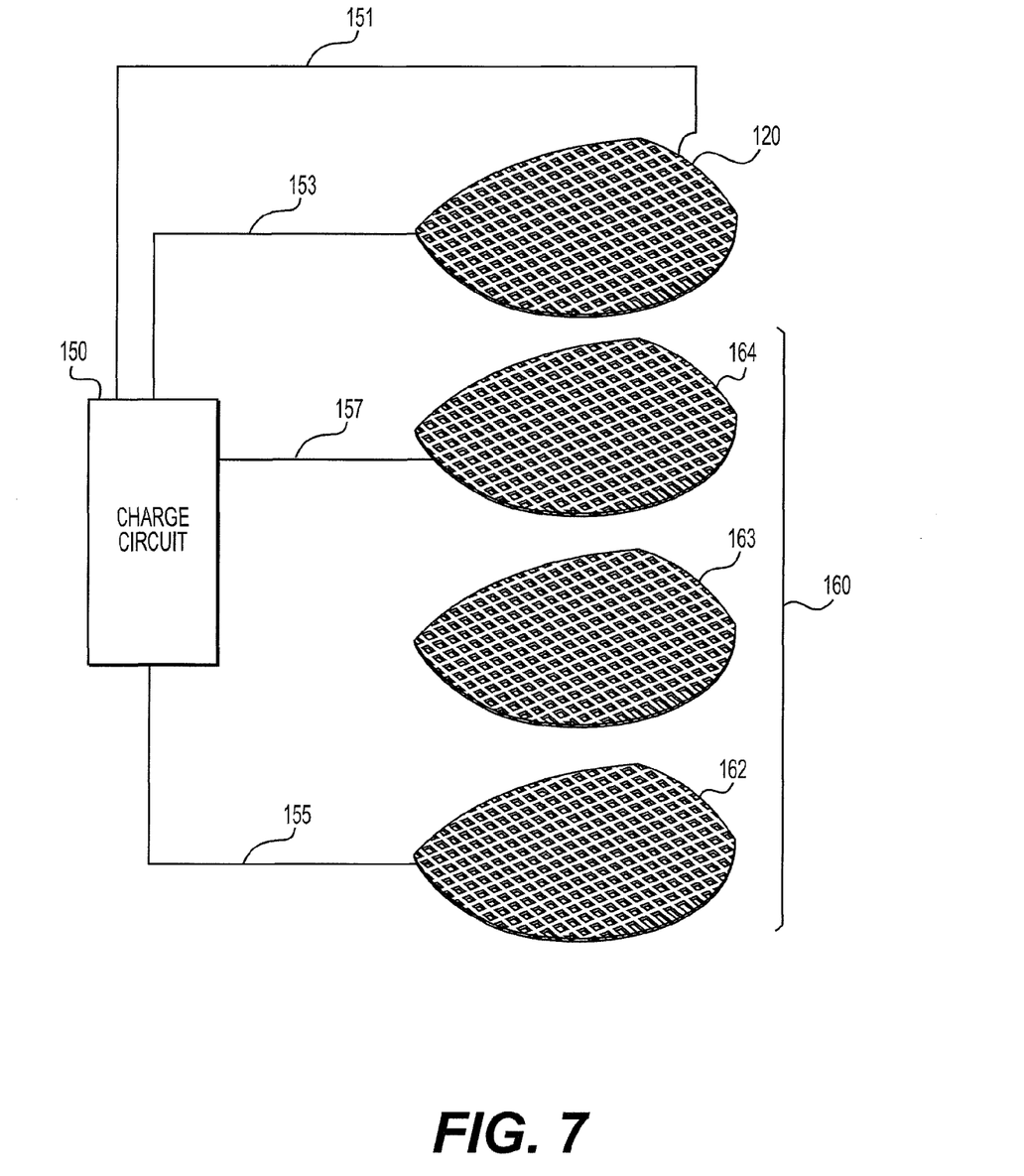
FIG. 7 shows a charge circuit and a lens structure according to an example embodiment.

FIG. 7 shows a charge circuit and a lens structure according to an example embodiment. Other embodiments and configurations may also be provided.

FIG. 7 shows a charge circuit 150 that may be provided on the eyewear apparatus 10. The charge circuit 150 may be electrically coupled to the battery structure and/or the solar panel of the lens structure. The charge circuit 150 may be a battery charger, an AC/DC (alternate current/direct current) converter and/or other circuitry for charging the battery structure and/or providing power to a load of the eyewear apparatus. The charge circuit 150 may charge the battery structure 110 (FIG. 6), the battery structure 130 (FIG. 5) and/or other battery structures.

FIG. 7 shows a lens structure that includes a battery structure 160 having an anode 162, a separator 163 and a cathode 164. FIG. 6 shows the lens structure in a separated manner for ease of discussion. For ease of illustration, FIG. 7 shows the anode 162 separated from the separator 163, the separator 163 separated from the cathode 164, and the cathode 164 separated from the solar panel 120. Each of the anode 162, the separator 163, the cathode 164 and the solar panel 120 are a separate grid configuration over the lens panel. The grid configurations of each of the anode 162, the separator 163, the cathode 164 and the solar panel 120 may be aligned.

The charge circuit 150 may provide current along electrical connection 155 to the anode 162, and may receive current along electrical connection 157 from the cathode 164. This flow of current may result in charging of the battery structure 160. As is shown in FIG. 7, the separator 163 is not directly coupled to the charge circuit 150.

FIG. 7 also shows the charge circuit 150 is electrically coupled to the solar panel 120 to receive current from the solar panel 120. For example, the charge circuit 150 may be connected to the solar panel by a first electrical connection 151 and a second electrical connection 153 such that the current may flow. The current received at the charge circuit 150 may be provided to the battery structure 160 and/or to other electronic components of the eyewear apparatus. The solar panel 120 may provide current based on light received on the solar panel 120.

The charge circuit 150 may be electrically coupled to the grid configuration of the anode 162. The electrically coupling may be provided at one or more locations of the anode 162. For example, the charge circuit 150 may be electrically coupled to endpoints of the grid configuration of the anode 162 and/or at an outer perimeter of the anode 162. One or more electrical connections may be made.

The charge circuit 150 may be electrically coupled to the grid configuration of the cathode 164. The electrically coupling may be provided at one or more locations of the cathode 164. For example, the charge circuit 150 may be electrically coupled to endpoints of the grid configuration of the cathode 164 and/or at an outer perimeter of the cathode 164. One or more electrical connections may be made.

The charge circuit 150 may be electrically coupled to the grid configuration of the solar panel 120. The electrically coupling may be provided at one or more locations of the solar panel 120. For example, the charge circuit 150 may be electrically coupled to endpoints of the grid configuration of the solar panel 120 and/or at an outer perimeter of the solar panel 120. One or more electrical connections may be made.

Various other electronic components may be provided on the eyewear apparatus. Each of these components may be powered by a battery structure. For example, a display device may be mounted onto the main frame. The display device may be powered by battery structure. As another example, a communication unit may be provided on the eyewear apparatus. The communication unit may be powered by a battery structure.

Other electronic components may also be provided on the eyewear apparatus to be powered by the battery structure. These components include, but are not limited to, a speaker, a microphone, a controller, a memory, a haptic device and/or etc.

The following examples pertain to further embodiments.

Example 1 is an eyewear apparatus comprising: a first lens structure to include: a lens panel, and a battery structure on the lens panel, the battery structure to include an anode, a separator and a cathode.

In Example 2, the subject matter of Example 1 can optionally include the battery structure includes a grid configuration of the anode, a grid configuration of the separator and a grid configuration of the cathode.

In Example 3, the subject matter of Example 1 and Example 2 can optionally include the grid configuration of the separator is aligned with the grid configuration of the anode, and the grid configuration of the cathode is aligned with the grid configuration of the separator.

In Example 4, the subject matter of Examples 1-3 can optionally include the first lens structure to further include a solar panel on the battery structure.

In Example 5, the subject matter of Example 1 and Example 4 can optionally include the solar panel is provided in a grid configuration.

In Example 6, the subject matter of Example 1 and Example 4 can optionally include the battery structure is between the lens panel and the solar panel.

In Example 7, the subject matter of Example 1 and Example 4 can optionally include the lens panel is between the battery structure and the solar panel.

In Example 8, the subject matter of Example 1 and Example 4 can optionally include the solar panel to receive energy from light and to provide current based on the received energy.

In Example 9, the subject matter of Examples 1-4 can optionally include the anode is provided on the lens panel, the separator is provided on the anode, and the separator is provided between the anode and the cathode.

In Example 10, the subject matter of Example 1 can optionally include the battery structure to store power.

In Example 11, the subject matter of Example 1 and Example 10 can optionally include the battery structure to provide power to an electronic component.

In Example 12, the subject matter of Example 1 can optionally include the lens panel is glass or plastic.

In Example 13, the subject matter of Example 1 can optionally include a second lens structure to include: another lens panel, and another battery structure on the another lens panel, the another battery structure to include an anode, a separator and a cathode.

In Example 14, the subject matter of Example 1 and Example 13 can optionally include a solar panel on the another lens panel.

Example 15 is an electronic system comprising: a frame assembly, and a first lens structure to include: a lens panel, and an anode, a separator and a cathode on the lens panel.

In Example 16, the subject matter of Example 15 can optionally include the anode has a grid configuration, the separator has a grid configuration and the cathode has a grid configuration.

In Example 17, the subject matter of Example 15 and Example 16 can optionally include the grid configuration of the separator is aligned with the grid configuration of the anode, and the grid configuration of the cathode is aligned with the grid configuration of the separator.

In Example 18, the subject matter of Examples 15-17 can optionally include the anode, the separator and the cathode form a battery structure.

In Example 19, the subject matter of Example 15 and Example 18 can optionally include the first lens structure to further include a solar panel on the battery structure.

In Example 20, the subject matter of Example 15 and Example 19 can optionally include the solar panel is provided in a grid configuration.

In Example 21, the subject matter of Example 15 and Example 19 can optionally include the battery structure is between the lens panel and the solar panel.

In Example 22, the subject matter of Example 15 and Example 19 can optionally include the lens panel is between the battery structure and the solar panel.

In Example 23, the subject matter of Example 15 and Example 19 can optionally include the solar panel to receive energy from light and to provide current based on the received energy.

In Example 24, the subject matter of Examples 18-23 can optionally include a charge circuit to charge the battery structure.

In Example 25, the subject matter of Example 15 and Example 24 can optionally include the charge circuit to charge the battery structure.

In Example 26, the subject matter of Example 15 and Example 24 can optionally include the charge circuit to electrically couple to the anode, and to electrically couple to the cathode.

In Example 27, the subject matter of Example 15 and Example 18 can optionally include the frame assembly to include at least one electronic component.

In Example 28, the subject matter of Example 15 and Example 27 can optionally include the electronic component to receive power from the battery structure.

In Example 29, the subject matter of Example 15 and Example 27 can optionally include the battery structure to store power.

In Example 30, the subject matter of Example 15 and Example 27 can optionally include the battery structure to provide power to the electronic component.

In Example 31, the subject matter of Example 15 can optionally include the anode is provided on the lens panel, the separator is provided on the anode, and the separator is between the anode and the cathode.

In Example 32, the subject matter of Example 15 can optionally include the lens panel is glass or plastic.

In Example 33, the subject matter of Example 15 can optionally include a second lens structure to include: another lens panel, and an anode, a separator and a cathode on the another lens panel.

In Example 34, the subject matter of Example 15 and Example 33 can optionally include the second lens structure to further include a solar panel on the another lens panel.

Example 35 is an eyewear apparatus comprising: a first lens structure to include: a lens panel, and battery means, on the first lens panel, for storing power.

In Example 36, the subject matter of Example 35 can optionally include the battery means includes an anode, a separator and a cathode.

In Example 37, the subject matter of Example 35 and Example 36 can optionally include the battery means includes a grid configuration of the anode, a grid configuration of the separator and a grid configuration of the cathode.

In Example 38, the subject matter of Example 35 and Example 37 can optionally include the grid configuration of the separator is aligned with the grid configuration of the anode, and the grid configuration of the cathode is aligned with the grid configuration of the separator.

In Example 39, the subject matter of Examples 35-38 can optionally include the first lens structure to further include solar means, on the battery means, for receiving energy from light.

In Example 40, the subject matter of Example 35 can optionally include the lens panel is glass or plastic.

In Example 41, the subject matter of Example 35 can optionally include a second lens structure to include: another lens panel, and another battery means on the another lens panel, for storing power.

In Example 42, the subject matter of Example 35 and Example 41 can optionally include the second lens structure to further include solar means, on the another battery means, for receiving energy from light.

Example 43 is a lens structure comprising: a lens panel, and a battery structure on the lens panel, the battery structure to include an anode, a separator and a cathode.

In Example 44, the subject matter of Example 43 can optionally include the battery structure includes a grid configuration of the anode, a grid configuration of the separator and a grid configuration of the cathode.

In Example 45, the subject matter of Example 43 and Example 44 can optionally include the grid configuration of the separator is aligned with the grid configuration of the anode, and the grid configuration of the cathode is aligned with the grid configuration of the separator.

In Example 46, the subject matter of Examples 43-45 can optionally include a solar panel on the battery structure.

In Example 47, the subject matter of Example 43 and Example 46 can optionally include the solar panel is provided in a grid configuration.

In Example 48, the subject matter of Example 43 and Example 46 can optionally include the battery structure is between the lens panel and the solar panel.

In Example 49, the subject matter of Example 43 and Example 46 can optionally include the lens panel is between the battery structure and the solar panel.

In Example 50, the subject matter of Example 43 and Example 46 can optionally include the solar panel to receive energy from light and to provide current based on the received energy.

In Example 51, the subject matter of Example 43 can optionally include the anode is provided on the lens panel, the separator is provided on the anode, and the separator is provided between the anode and the cathode.

In Example 52, the subject matter of Example 43 can optionally include the lens panel is glass or plastic.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An eyewear apparatus comprising:
   a first lens structure to include:
      a lens panel;
      a battery structure on the lens panel, the battery structure to include an anode having a grid configuration, a separator having a grid configuration and a cathode having a grid configuration; and
      a solar panel on the battery structure.

2. The eyewear apparatus of claim 1, wherein the solar panel is provided in a grid configuration.

3. The eyewear apparatus of claim 2, wherein openings of the grid configuration of the separator are aligned with openings of the grid configuration of the cathode.

4. The eyewear apparatus of claim 1, wherein the battery structure to provide power to an electronic component.

5. The eyewear apparatus of claim 1, further comprising:
   a second lens structure to include:
      another lens panel; and
      another battery structure on the another lens panel, the another battery structure to include an anode, a separator and a cathode.

6. The eyewear apparatus of claim 5, further comprising a solar panel on the another lens panel.

7. The eyewear apparatus of claim 1, wherein the grid configuration of the separator is aligned with the grid configuration of the anode, and the grid configuration of the cathode is aligned with the grid configuration of the separator.

8. The eyewear apparatus of claim 1, wherein openings of the grid configuration of the separator are aligned with openings of the grid configuration of the anode, and openings of the grid configuration of the cathode are aligned with openings of the grid configuration of the separator.

9. An electronic system comprising:
   a frame assembly; and
   a first lens structure to include:
      a lens panel;
      an anode, a separator and a cathode on the lens panel, wherein the anode, the separator and the cathode are aligned in a grid configuration; and
      a solar panel.

10. The electronic system of claim 9, wherein the anode, the separator and the cathode form a battery structure.

11. The electronic system of claim 10, wherein the solar panel is on the battery structure.

12. The electronic system of claim 10, further comprising a charge circuit to charge the battery structure.

13. The electronic system of claim 10, wherein the frame assembly to include at least one electronic component.

14. A lens structure comprising:
   a lens panel;
   a battery structure on the lens panel, the battery structure to include an anode having a grid configuration, a separator having a grid configuration and a cathode having a grid configuration; and
   a solar panel on the battery structure.

15. The lens structure of claim 14, wherein the grid configuration of the separator is aligned with the grid configuration of the anode, and the grid configuration of the cathode is aligned with the grid configuration of the separator.

16. The lens structure of claim 14, wherein the solar panel is provided in a grid configuration.

17. The lens structure of claim 14, wherein the solar panel to receive energy from light and to provide current based on the received energy.

18. The lens structure of claim 14, wherein the anode is provided on the lens panel, the separator is provided on the anode, and the separator is provided between the anode and the cathode.

19. The lens structure of claim 14, wherein the lens panel is glass or plastic.

20. The lens structure of claim 14, wherein openings of the grid configuration of the separator are aligned with openings of the grid configuration of the anode, and openings of the grid configuration of the cathode are aligned with openings of the grid configuration of the separator.

* * * * *